US012712946B2

(12) United States Patent
Shepherd et al.

(10) Patent No.: US 12,712,946 B2
(45) Date of Patent: Aug. 18, 2026

(54) SYSTEMS AND METHODS FOR MANAGING A USER PREFERENCE DIGITAL PROFILE FOR ENHANCED USER ACCESSIBILITY

(71) Applicant: Wells Fargo Bank, N.A., San Francisco, CA (US)

(72) Inventors: Matthew Mullin Shepherd, Charlotte, NC (US); Ramesh Yarlagadda, Charlotte, NC (US); Sarah W. Phelps, Annapolis, MD (US); Tambra Nichols, Charlotte, NC (US); John Andrew Chuprevich, Davidson, NC (US); Bryan Hall, Charlotte, NC (US); Bradford A. Shea, Mint Hill, NC (US); Ravi K. Maganti, Eden Prairie, MN (US); Debashis Ghosh, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 135 days.

(21) Appl. No.: 18/611,387

(22) Filed: Mar. 20, 2024

(65) Prior Publication Data

US 2025/0301044 A1 Sep. 25, 2025

(51) Int. Cl.
*G06F 15/16* (2006.01)
*H04L 9/32* (2006.01)
*H04L 67/306* (2022.01)

(52) U.S. Cl.
CPC .......... *H04L 67/306* (2013.01); *H04L 9/3213* (2013.01)

(58) Field of Classification Search
CPC ............................ H04L 67/306; H04L 9/3213
USPC .......................................................... 709/203
See application file for complete search history.

(56) References Cited

U.S. PATENT DOCUMENTS

| | | | | |
|---|---|---|---|---|
| 10,038,783 | B2 | 7/2018 | Wilcox | |
| 10,142,459 | B2 | 11/2018 | Wohlert | |
| 10,320,781 | B2 | 6/2019 | Naqvi | |
| 10,779,724 | B2 | 9/2020 | Goodsitt | |
| 10,915,286 | B1 | 2/2021 | Xiong | |
| 2017/0230848 | A1* | 8/2017 | Brouillette | H04W 12/37 |
| 2018/0039989 | A1* | 2/2018 | Beye | G06Q 30/0601 |
| 2023/0075767 | A1* | 3/2023 | Bradley | G06Q 30/0234 |
| 2023/0244502 | A1* | 8/2023 | Mossoba | G06F 16/954 715/704 |
| 2025/0036356 | A1* | 1/2025 | Hillborg | G06V 20/46 |
| 2025/0036433 | A1* | 1/2025 | Zax | G06F 9/451 |
| 2025/0111408 | A1* | 4/2025 | Hedges, Jr. | G06N 20/00 |
| 2025/0208971 | A1* | 6/2025 | Bryant | G06Q 50/14 |

* cited by examiner

*Primary Examiner* — Alan S Chou
(74) *Attorney, Agent, or Firm* — K&L Gates LLP

(57) ABSTRACT

Systems, apparatuses, methods, and computer program products are disclosed for generating a user preference digital profile for a user. An example method includes determining one or more user preference parameter values for one or more user preference parameters for the user and generating the user preference digital profile for the user. The example method further includes assigning a sharing category to the one or more user preference parameter values in the user preference digital profile and storing the user preference digital profile in a digital identity management repository.

20 Claims, 7 Drawing Sheets

SYSTEMS AND METHODS FOR MANAGING A USER PREFERENCE DIGITAL PROFILE FOR ENHANCED USER ACCESSIBILITY

BACKGROUND

Electronic and information technology may be subject to compliance standards. For example, the American with Disabilities Act (ADA) requires that digital technology be accessible to individuals with disabilities. Additionally, the Web Content Accessibility Guidelines (WCAG) defines technical standards for web accessibility and has been used as guidelines for determining ADA compliance of digital and/or online content.

BRIEF SUMMARY

As mentioned above, online content is subject to compliance standards such as WCAG. The ADA has used WCAG as a guideline for evaluating ADA compliance of web design and online content. Non-compliance to digital accessibility standards may expose an organization or entity to legal processing under the ADA, potentially leading to substantial fines and harm to the organization's reputation. Thus, it is imperative for organizations to generate and provide online content that is accessible to all users.

Although WCAG has laid a foundation for online content accessibility, these guidelines are rigid and fail to take into account individual accessibility preferences of a user. WCAG additionally does fully address the needs of all individuals with disabilities. For example, WCAG currently has limited guidelines for users with cognitive disabilities. Additionally, even WCAG guidelines for more robustly covered areas, such as visual or hearing impairments, still fail to consider individual preferences of users that may have varying levels of visual and/or hearing impairments. Furthermore, although entities and institutions may face penalties for non-compliance, users currently lack the ability to improve interface content accessibility and remain reliant on the institution's adherence to these accessibility standards. This can be frustrating for users who may struggle to access digital content and who's only recourse is to wait for the entity to implement more accessible digital content or seek remedy through legal recourse.

In contrast to relying on individual institutions to provide digital content that adheres to limited WCAG standards, example embodiments described herein allow users to control their own accessibility preferences and provide these accessibility preferences to entities to ensure they are provided with accessible digital content. In particular, example embodiments described herein allow users to generate a user preference digital profile, which includes one or more user preference parameter values for one or more user preference parameters. These user preference parameter values may describe user preferences for the user. In particular, user preference parameter values may control how interface content is presented to the user and/or how a user prefers to be interacted with. Additionally, example embodiments described herein contemplate automatically determining one or more user preference parameter values by leveraging machine learning techniques to evaluate user responses to provided interface content. Furthermore, example embodiments described herein allow for accessibility tools to be generated for the user preference digital profile. These accessibility tools may be an add-on, a plug-in, or other software tool that may provide one or more accessibility services to the user. The accessibility tool may be executed on user devices and/or entity devices such that even in an instance where an entity lacks an accessibility functionality, these accessibility tools may be executed to ensure the user is provided with accessible interface content. Furthermore, example embodiments described herein allow users to selectively share their user preference digital profile with other entities. As such, these entities may be provided with one or more user preference parameter values and/or accessibility tools that may be used to facilitate a more accessible and pleasant interaction with the user.

Accordingly, the present disclosure sets forth systems, methods, and apparatuses that allow users to generate and manage a user preference digital profile to increase overall accessibility for the user. In doing so, example embodiments described herein allow individual users to control how interface content is presented and may do so without explicit reliance on the individual entity to provide this accessibility. Thus, users may leverage a user preference digital profile to control how interface content is presented and how user interactions may proceed, thereby empowering users to ensure optimal accessibility for each user interaction.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers, programmable automation controllers, industrial computers, desktop computers, personal data assistants, laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
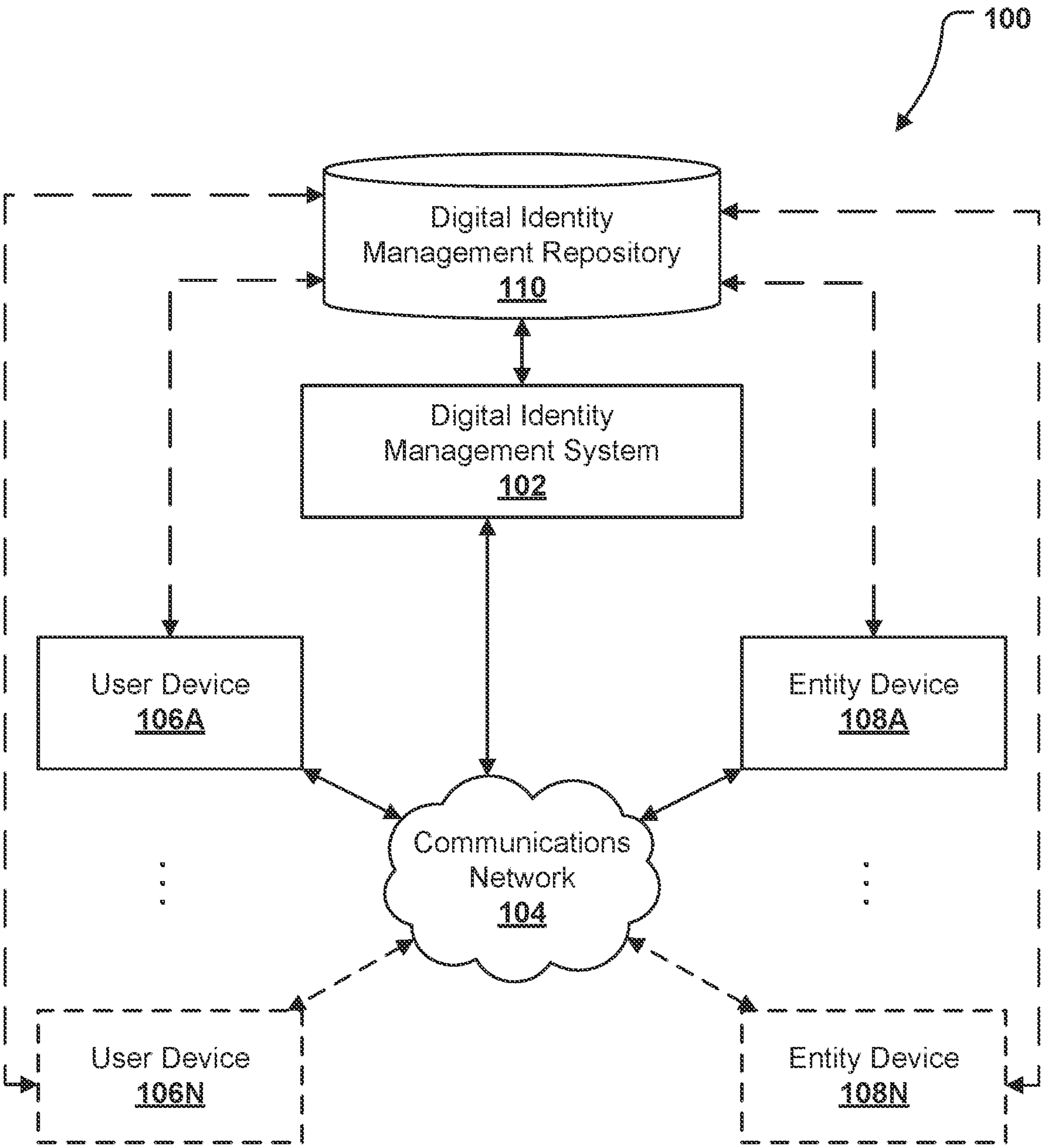
FIG. 1 illustrates a system in which some example embodiments may be used generating and maintaining a user preference digital profile for a user.

Example embodiments described herein may be implemented using any of a variety of computing devices or servers. To this end, FIG. 1 illustrates an example environment 100 within which various embodiments may operate. As illustrated, a digital identity management system 102 may receive and/or transmit information via communications network 104 (e.g., the Internet) with any number of other devices, such as one or more of user devices 106A-106N and/or entity devices 108A-108N.

The digital identity management system 102 may be implemented as one or more computing devices or servers, which may be composed of a series of components. Particular components of the digital identity management system 102 are described in greater detail below with reference to apparatus 200 in connection with FIG. 2.

In some embodiments, the digital identity management system 102 further includes a digital identity management repository 110 that comprises a distinct component from other components of the digital identity management system 102. The digital identity management repository 110 may be embodied as one or more direct-attached storage devices (such as hard drives, solid-state drives, optical disc drives, or the like) or may alternatively comprise one or more Network Attached Storage devices independently connected to a communications network (e.g., communications network 104). In some embodiments, the digital identity management repository 110 may host the software executed to operate the digital identity management system 102. The digital identity management repository 110 may store information relied upon during operation of the digital identity management system 102, such as various models, data sets (e.g., user evaluation content sets, and/or the like) that may be used by the digital identity management system 102, data and documents to be analyzed using the digital identity management system 102, or the like. In some embodiments, the digital identity management repository 110 may store modified interface content generated by the digital identity management system. In addition, the digital identity management repository 110 may store control signals, device characteristics, and access credentials enabling interaction between the digital identity management system 102 and one or more of the user devices 106A-106N or entity devices 108A-108N.

In some embodiments, the digital identity management repository 110 corresponds to a distributed ledger technology (DLT) infrastructure, such as a blockchain. In some embodiments, the digital identity management repository 110 may be embodied as a server or collection of servers that may interface with decentralized applications such as a distributed ledger to track or enable certain functionality. In some embodiments, the collection of networked distributed ledger nodes of a blockchain, which may be permissionless (public) or permissioned (private). For example, in some embodiments, the digital identity management repository 110 may comprise a collection of networked distributed ledger nodes of a blockchain or blockchain technology that is capable of creating and exchanging blockchain tokens. In some embodiments, the distributed ledger may allow for Turing-complete scripting of contracts, known also as smart contracts, distributed applications, or decentralized applications, to be executed on the distributed ledger or blockchain. The distributed ledger may be related to other blockchain networks not pictured here. For example, the distributed ledger may be a sidechain of another blockchain network, or another network (not shown) may form a sidechain of the distributed ledger. The nodes may be embodied by specialized node devices, or may be embodied by any computing devices or server devices known in the art. In some embodiments the digital identity management system 102 may be a node of the distributed ledger or may be external to the blockchain. In some embodiments, the blockchain is a federated blockchain that is associated with one or more third-party entities. One or more third-party devices (e.g., any one of entity devices 108A-108N) associated with a third-party entity that is part of the federated blockchain, may be a node of the blockchain. In some embodiments, user preference digital profiles, generated by the digital identity management system 102 may be stored within a block on the blockchain of the digital identity management repository.

The one or more user devices 106A-106N and the one or more entity devices 108A-108N may be embodied by any computing devices known in the art. The one or more user devices 106A-106N and the one or more entity devices 108A-108N need not themselves be independent devices, but may be peripheral devices communicatively coupled to other computing devices.

Although FIG. 1 illustrates an environment and implementation in which the digital identity management system 102 interacts indirectly with a user via one or more of user devices 106A-106N and/or entity devices 108A-108N, in some embodiments users may directly interact with the digital identity management system 102 (e.g., via communications hardware of the digital identity management system 102), in which case a separate user device 106A-106N and/or entity device 108A-108N may not be utilized. Whether by way of direct interaction or indirect interaction via another device, a user may communicate with, operate, control, modify, or otherwise interact with the digital identity management system 102 to perform the various functions and achieve the various benefits described herein.

Example Implementing Apparatuses

Figure 2:
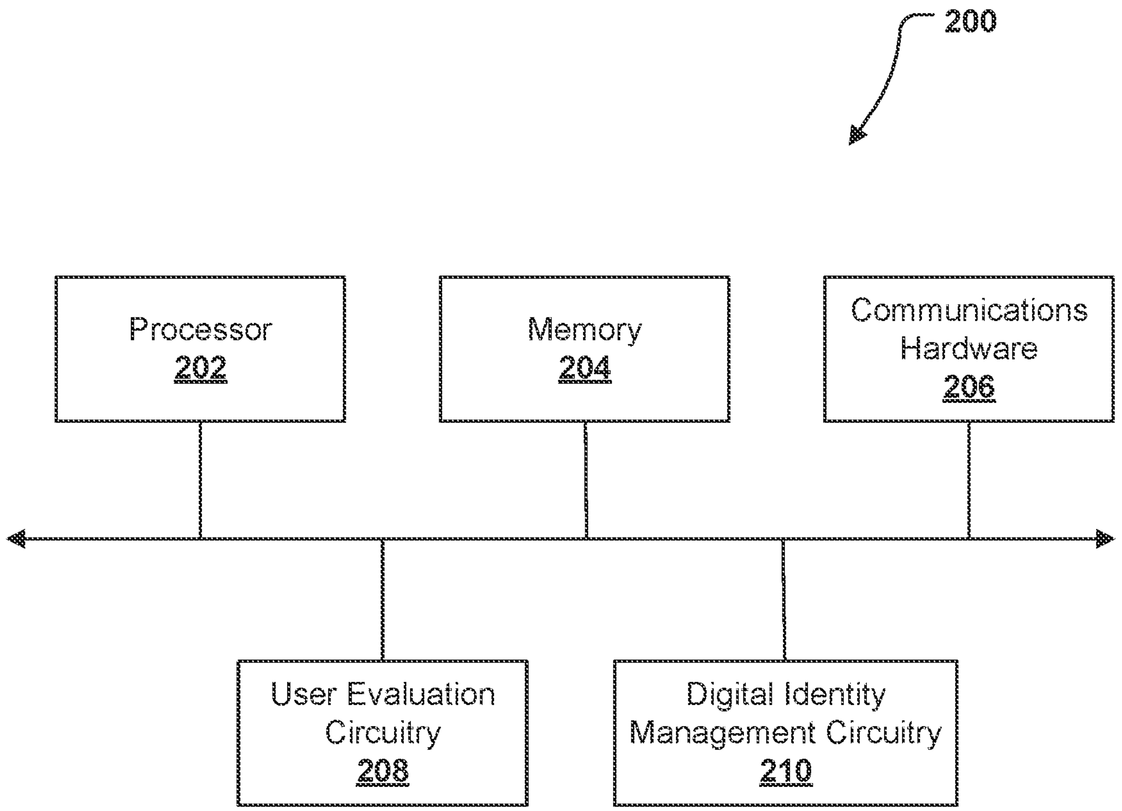
FIG. 2 illustrates a schematic block diagram of example circuitry embodying a system device that may perform various operations in accordance with some example embodiments described herein.

The digital identity management system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-5. As illustrated in FIG. 2, the apparatus 200 may include processor 202, memory 204, communications hardware 206, user evaluation circuitry 208, digital identity management circuitry 210, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, desktop application, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a user evaluation circuitry 208 that is configured to determine one or more user preference parameter values, identify a user evaluation set, and/or the like. The user evaluation circuitry 208 may utilize processor 202, memory 204, or any other hardware component included in the apparatus 200 to perform these operations, as described in connection with FIGS. 3-5 below. The user evaluation circuitry 208 may further utilize communications hardware 206 to gather data from a variety of sources (e.g., user devices 106A-106N, entity device 108A-108N, or digital identity management repository 110, as shown in FIG. 1).

In addition, the apparatus 200 further comprises digital identity management circuitry 210 that is configured to generate a user preference digital profile, assign a sharing category to user preference parameter values, generate accessibility tools, authenticate an update request, and/or the like. In some embodiments, the digital identity management circuitry 210 is further configured to authenticate sharing requests, determine an authorized sharing category for the sharing request, determine user preference parameter values to include in a sharing response, and/or the like. The digital identity management circuitry 210 may utilize processor 202, memory 204, or any other hardware component included in the apparatus 200 to perform these operations, as described in connection with FIGS. 3-5 below. The digital identity management circuitry 210 may further utilize communications hardware 206 to gather data from a variety of sources (e.g., user devices 106A-106N, entity device 108A-108N, or digital identity management repository 110, as shown in FIG. 1).

Although components 202-210 are described in part using functional language, it will be understood that the particular implementations necessarily include the use of particular hardware. It should also be understood that certain of these components 202-210 may include similar or common hardware. For example, the user evaluation circuitry 208 and digital identity management circuitry 210 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the user evaluation circuitry 208 and digital identity management circuitry 210 may leverage processor 202, memory 204, or communications hardware 206 as described above, it will be understood that any of user evaluation circuitry 208 and digital identity management circuitry 210 may include one or more dedicated processor, specially configured field programmable gate array, or application specific interface circuit to perform its corresponding functions, and may accordingly leverage processor 202 executing software stored in a memory (e.g., memory 204), or communications hardware 206 for enabling any functions not performed by special-purpose hardware. In all embodiments, however, it will be understood that user evaluation circuitry 208 and digital identity management circuitry 210 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of graphical user interfaces and flowcharts.

Example Operations

Figure 3:
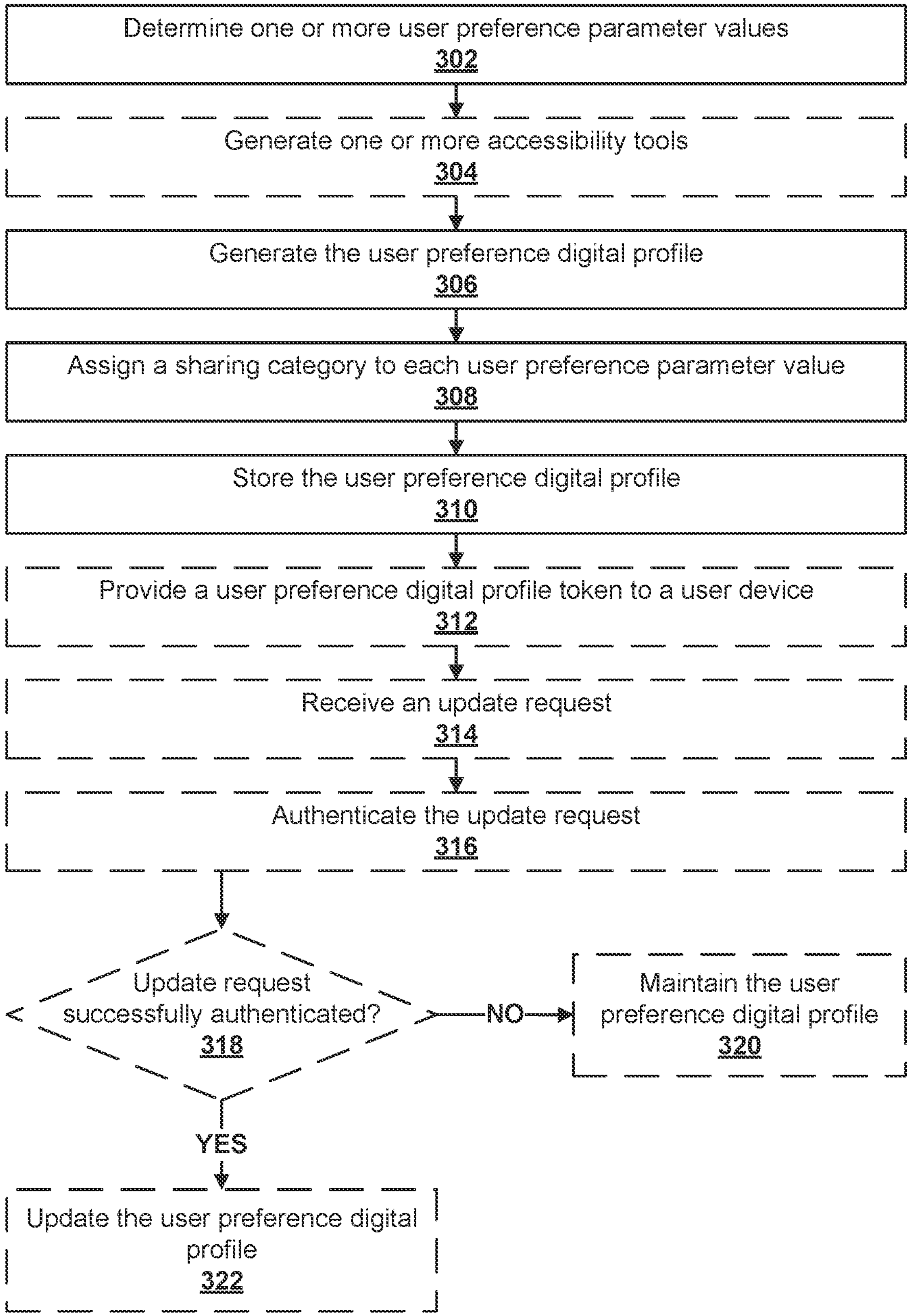
FIG. 3 illustrates an example flowchart for generating and storing a user preference digital profile for a user, in accordance with some example embodiments described herein.
Figure 4:
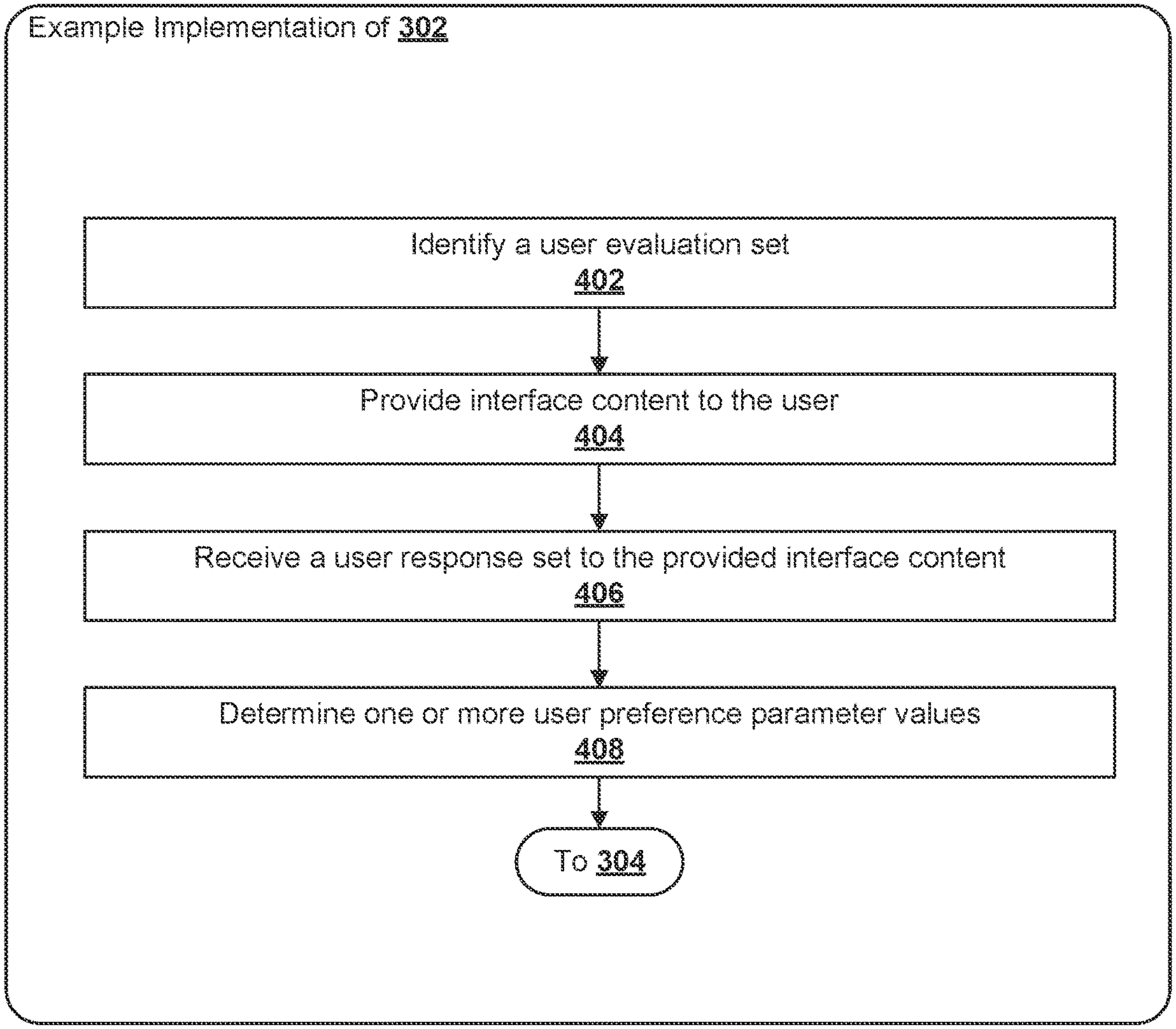
FIG. 4 illustrates an example flowchart for determining one or more user preference parameter values, in accordance with some example embodiments described herein.
Figure 5:
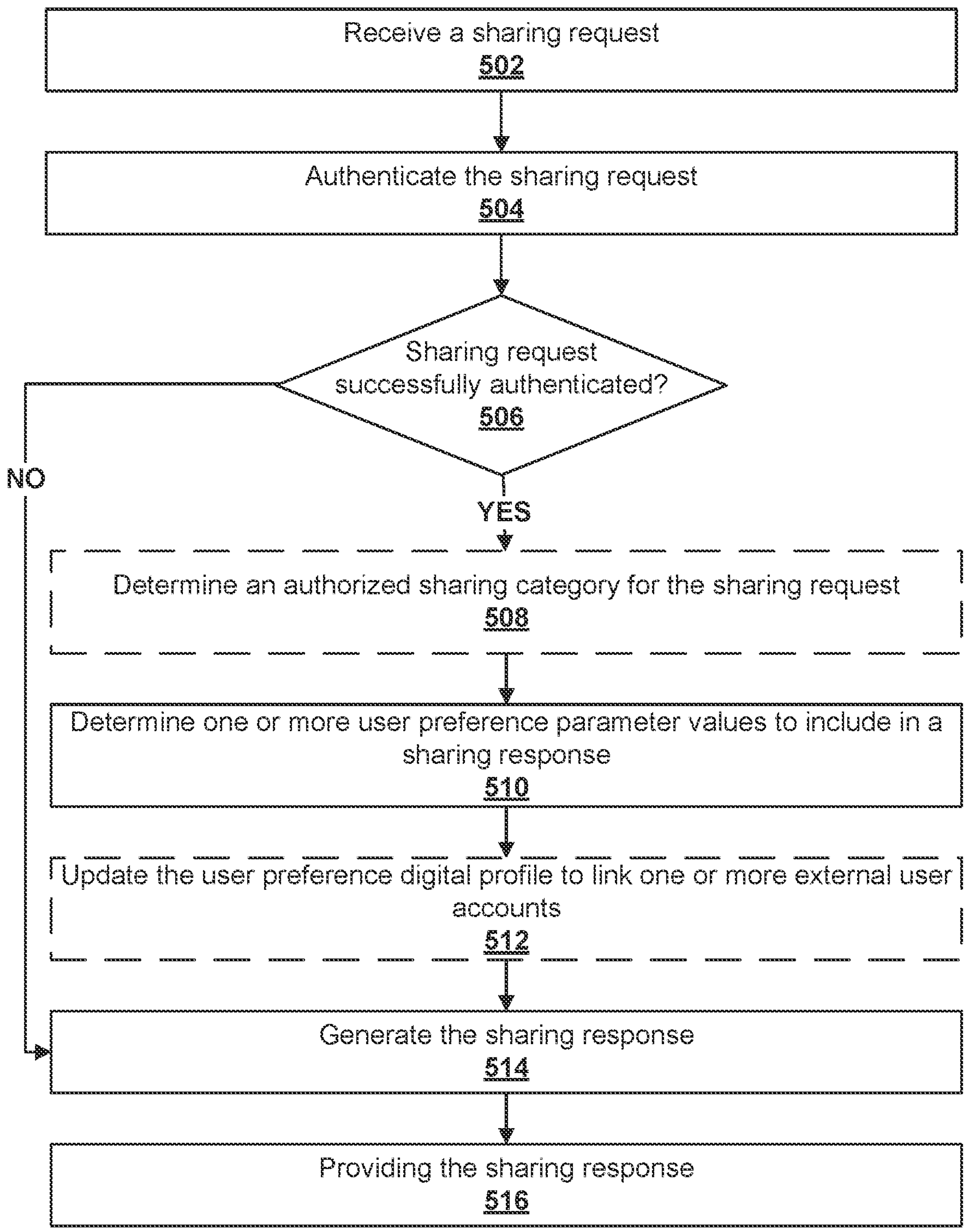
FIG. 5 illustrates an example flowchart for generating a sharing response to a sharing request, in accordance with some example embodiments described herein.

Turning to FIGS. 3-5, example flowcharts are illustrated that contain example operations implemented by example embodiments described herein. The operations illustrated in FIGS. 3-5 may, for example, be performed by system device of digital identity management system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, user evaluation circuitry 208, digital identity management circuitry 210, and/or any combination thereof. It will be understood that user interaction with the digital identity management system 102 may occur directly via communications hardware 206 or may instead be facilitated by a separate user device 106A-106N and/or entity device 108A-108N, as shown in FIG. 1, and which may have similar or equivalent physical componentry facilitating such user interaction.

Example Operations for Generating a User Preference Digital Profile

Turning first to FIG. 3, example operations are shown for generating and maintaining a user preference digital profile.

As shown by operation 302, the apparatus 200 includes means, such as processor 202, memory 204, communications hardware 206, user evaluation circuitry 208, or the like, for determining one or more user preference parameter values. Prior to the digital identity management circuitry 210 generating the user preference digital profile, the user evaluation circuitry 208 may first determine one or more user preference parameter values for one or more user preference parameters for the user. In some embodiments, the user evaluation circuitry 208 may determine the one or more user preference parameter values and the digital identity management circuitry 210 may generate the user preference digital profile in response to receiving a user preference digital profile request. In particular, in some embodiments, the communications hardware 206 may be configured to receive a user preference digital profile request. The communications hardware 206 may receive the user preference digital profile request from a user device, such as any one of user devices 106A-106N.

The user preference digital profile request may include an indication of a user account associated with apparatus 200 For example, the user preference digital profile request may include a user identifier (e.g., a username, an email address, a phone number, and/or the like) and a user credential (e.g., a password, a pin, and/or the like) that may be associated with the user account. If the user does not yet have a user account associated with apparatus 200, the user may be required to first create a user account. Thus, the user evaluation circuitry 208 may determine the user account to which the user preference digital profile request corresponds.

A user preference parameter value may describe a particular value indicative of a preference of the user. In some embodiments, a user preference parameter value may control how interface content is presented to the user. User preference parameter values may also describe a preferred way of user interaction for the user. Each user preference parameter value may correspond to a user preference parameter. A user preference parameter may describe a category of user preference and further, may relate to a particular broader function for user interaction preferences. For example, a user preference parameter may relate to a user preference, a language preference, a disability accommodation, an interface content accommodation setting, an interface content text setting, an interface content image setting, an interface content audio setting, and/or the like. A name preference may relate to user preferences parameters such as full name user preference sub-field, a prefix user preference sub-field, a nickname user preference sub-field, a pronoun user preference sub-field, etc. A language preference may relate to user preferences parameters such as preferred language, secondary languages, a fluency level, etc. A disability accommodation may relate to user preferences parameters such as a wheelchair status, a visual impairment, a hearing impairment, a mobility impairment, a cognitive impairment, etc. An interface content accommodation may relate to user preferences parameters such as an adaptive user interface presentation requirement, an adaptive user interface navigation requirement, etc. An interface content text setting may relate to user preferences parameters such a text size, text font, text color, kernel spacing, text language, etc. An interface content image setting may relate to user preferences parameters such an image size, image coloring, image description requirement, etc. An interface content audio setting may relate to user preferences parameters such as an audio volume setting, an audio pitch setting, an audio frequency setting, an audio gain setting, an accessibility narration requirement, a closed captioning requirement, etc.

In some embodiments, the user preference digital profile request may further include one or more user preference parameter values entered by the user. For example, the user may use his/her user device (e.g., any one of user devices 106A-106N) to login into his/her user account (e.g., using a web browser, mobile application, native application, or the like) and select an option to provide a user preference digital profile request. The user preference digital profile request may include one or more prompts or questions to which the user can respond. The user may provide user input to the user device to answer the prompts or questions. Each prompt or question may relate to a particular user preference parameter. As such, the user may manually provide an indication of one or more user preference parameter values and the user evaluation circuitry 208 may analyze the user preference digital profile request to determine one or more user preference parameter values.

In some embodiments, a user may only provide or select a user preference from a preset list of user preferences parameters. Thus, the user evaluation circuitry 208 may automatically determine a user preference parameter value. Alternatively, the user may provide freeform text, an audio response, or another unstructured user input as a response for a question prompt. For unstructured responses, the user evaluation circuitry 208 may apply one or more natural language processing (NLP) techniques, image recognition techniques, audio processing techniques, and/or the like to determine a user preference parameter value. For example, the user evaluation circuitry 208 may apply one or more similarity scoring techniques, such as a Euclidean distance algorithm, a cosine similarity algorithm, a Jaccard similarity algorithm, a Levenshtein distance algorithm, a hamming distance algorithm, a TF-IDF algorithm, and/or the like to determine A user preference parameter value for the user response. Alternatively, in some embodiments, the user evaluation circuitry 208 may simply use the unstructured user response as the user preference parameter value.

Alternatively, in some embodiments, a user may be unsure of what his/her user preference parameter values are and may prefer to participate in an evaluation designed to determine one or more user preferences. In particular, interface content may be provided to the user via his/her user device, and he/she may be prompted to provide a response to the provided interface content. The user evaluation circuitry 208 may then determine one or more user preference parameter values based on the user responses, as described in more detail in FIG. 4.

In some embodiments, operation 302 may be performed in accordance with the operations described by FIG. 4. Turning now to FIG. 4, example operations are shown for determining one or more user preference parameter values. By performing the operations described in FIG. 4, one or more user preference parameter values may automatically be determined for the user. This may be particularly beneficial for users who are unaware that they may have a user preference at all. By way of particular example, some users may be unaware they are colorblind or may be unaware of what type of colorblindness they experience. However, they may experience difficulty with interface content that uses particular colors (e.g., red and green or blue and yellow) schemes. The interface content provided to the user as described in FIG. 4 may reveal the user has A user preference parameter value to avoid particular color combinations because he/she has difficulty with distinguishing these colors. Other examples may include, but are not limited to, determining user preferences for a particular text font, text size, text color, language, accessibility narration settings, screen reader settings, visibility settings, etc.

As shown by operation 402, the apparatus 200 includes means, such as processor 202, memory 204, user evaluation circuitry 208, or the like, for identifying a user evaluation set. In some embodiments, the user evaluation circuitry 208 may identify a user evaluation set. A user evaluation set may include a plurality of interface content. Interface content may include one or more interface content components. Interface content may be configured with software instructions that cause associated interface content components to render on a display screen, such as a user device (e.g., any one of user devices 106A-106N). For example, interface content may be a webpage, an application page, and/or the like. In some embodiments, the interface content may further be associated with an endpoint and/or uniform resource locator (URL) that may be used to access the interface content.

The interface content may include any number of interface content components. In some embodiments, interface content components may be assigned an interface content component type and/or an interface content component subtype. Interface content component types may be indicative of the broader functionality the interface content component serves for the interface content. For example, an interface content component type may include a structure interface content component type, a styling interface content component type, an interactivity interface content component type, a visual interface content component type, a textual interface content component type, a navigation interface content component type, and/or a plugin interface content component type. A structure interface content component type may be assigned to interface content components (e.g., Hypertext Markup Language (HTML)) that provide the structure of the interface content components and defines various portions of the other interface content. A styling interface content component type may be assigned to interface content components (e.g., a Cascading Style Sheet (CSS)) that control the visual presentation of other interface content components (e.g., layout, colors, fonts, spacing, and the like). An interactivity interface content component may be assigned to interface content components (e.g., JavaScript) configured to handle user interactivity with some interface content components (e.g., form submissions, animations, user events such as clicking or keyboard input, or the like). A visual interface content component type may be assigned to interface content components (e.g., images, videos, and audio) of various formats (e.g., joint photographic experts group (JPG/JPEG), portable network graphics (PNG), graphics interchange format (GIF), motion picture experts group advanced video coding (MP4), web media file (WebM), and/or the like) that control visual presentation. A textual interface content component type may be assigned to interface content components that supply text information to the user. A navigation content component may be assigned to interface content components that are associated with hyperlinks to aid the user with navigating the website. A plugin interface content component type may be assigned to interface content components that may add more complex features to the website, such as slideshows, chatbots, analytics tools, or the like.

Additionally, each interface content component may be assigned an interface content component subtype that is indicative of the function of the particular interface content component within the interface content component type. For example, an interface content component that depicts a single image may be assigned an image interface content component subtype.

In some embodiments, the received interface content components may already be labelled with the interface content component type and/or interface content component subtypes. Alternatively, the interface content may be configured in accordance with a predefined structure such that the interface content component type and/or interface content component subtype may be determined by user evaluation circuitry 208 and/or the like.

Furthermore, interface content components may be associated with one or more values, parameters, settings, configurations, and/or the like. By way of example, an interface content component may be an image and thus, may be assigned a visual interface content component type and an image interface content component subtype. The interface content component may include values for one or more pixels associated with the image. As another example, the interface content component may be a screen reader and thus, may be assigned an interactivity interface content component type and a screen reader interface content component subtype. The screen reader may include settings such as the reader tone, a reader pitch, a reader volume, a reader speed, and/or other auditory settings. As yet another example, the interface content component may be textbox text and thus, may be assigned a textual interface content component type and a textbox interface content component subtype. The textbox text may include characters that form the textbox text, font size for each text character, font style for each character, font color for each character, a font spacing between characters, and/or the like. As yet another example, the interface content component may be a CSS page structure and thus, may be assigned a styling interface content component type and CSS page interface content component subtype. The CSS page structure may include the various layout components of an HTML page, such as the position of various website components within a layout. As yet another example, the interface content component may be a HTML page structure and thus, may be assigned a structure interface content component type and HTML page interface content component subtype. The HTML page structure may include reference to one or more HTML objects or other components included on a website page.

Each interface content included in the user evaluation set may include at least one unique interface content component. In this way, each interface content included in the user evaluation set is unique in at least one respect. This may allow for variability within the interface content. As will be described in greater detail below, this variability allows for a robust set of user responses to be collected for a variety of interface content and allow for user preference parameter values to be refined for the user.

In some embodiments, the interface content is generated manually by one or more users. In some embodiments, the interface content is automatically generated using an interface content generation model. An interface content generation model may be a machine learning model that is configured to receive an initial interface content with interface content components and modify one or more values, parameters, settings, configurations, and/or the like for at least one interface content component to generate another interface content. In some embodiments, the interface content generation model is a machine-learning model, such as a generative adversarial network (GAN). The interface content generation model may allow interface content to be generated in a way that reduces the manual burden on users for manually modifying individual interface content components.

As shown by operation 404, the apparatus 200 includes means, such as processor 202, memory 204, communications hardware 206, user evaluation circuitry 208, or the like, for providing interface content to the user. In some embodiments, the user evaluation circuitry 208 may provide one or more interface content from the user evaluation set to the communications hardware 206. The communications hardware 206 may provide the interface content to a user device (e.g., any one of user devices 106A-106N), such as the user device that provided the user preference digital profile request.

In some embodiments, the communications hardware 206 may provide two or more interface content to the user device at one time. This may cause the provided interface content to be rendered or displayed to the user via the user device and/or another associated display. In this way, the user may simultaneously view interface content side by side. This may help the user make a selection on which content interface he/she prefers.

Alternatively, the communications hardware 206 may provide only a single interface content at a time. In some embodiments, the user evaluation circuitry 208 may additionally provide a test prompt to the user. The test prompt may relate to the provided interface content. For example, the test prompt may provide instructions to the user that direct them to perform a task. By way of particular example, the test prompt may direct the user to select a first navigation link (e.g., corresponding to a navigation interface content component type). The test prompt may be rendered on the user device such that the user may read the test prompt and/or may be audibly output to the user via the user device.

As shown by operation 406, the apparatus 200 includes means, such as processor 202, memory 204, communications hardware 206, user evaluation circuitry 208, or the like, for receiving a user response set to the provided interface content. Once the interface content is provided to the user via the user device (e.g., any one of user devices 106A-106N), the communications hardware 206 may receive a user response from the user via the user device. The user response may be provided in response to detection of user input received from the user. A user response set may include each user response to the provided interface content.

In some embodiments, the user response may be a selection of at least one interface content from the user who is presented with two or more interface content. For example, the user may be presented with two or more interface content and the test prompt may direct the user to select the displayed interface content they prefer. The user may then provide user input to select (e.g., click, tap, audibly select, and/or the like) the displayed interface content option that the user prefers. In some embodiments, the user response may be indicative of multiple selections of interface content in an instance in which the user was presented with multiple rounds of interface content presentation. Additionally, each user response included in the user response set may be associated with a test prompt such that the user response is able to be correlated to the corresponding test prompt.

In some embodiments, the user response may be one or more user inputs that the user made in order to attempt to satisfy the test prompt. The user response may additionally indicate the time window from the time the test prompt was presented to the user to when the user performed the requested action. Thus, the user response may include any erroneous user inputs, which may indicate the user experienced difficulty when attempting to perform the requested test prompt. For example, if the navigation interface content components are too close together, the user may accidentally select an incorrect navigation interface content component instead of the desired navigation interface content component. Additionally, the time window may be indicative of the level of complexity experienced by the user when navigating the interface content to perform the test prompt. As another example, the user may experience difficult completing the test prompt because the interface content was unclear and thus, the time window for completion may be a longer duration than an expected duration. In some embodiments, a time window threshold may also be exceeded such that the user response may indicate that the user failed to complete the test prompt within the time window threshold. These difficulties may in some cases, be attributed to accessibility difficulties experienced by the user with respect to the particular interface content.

Additionally, in some embodiments, the user response may include user feedback with respect to the interface content. The user feedback may be indicative of user preferences with respect to the interface content, such as user sentiment (e.g., positive, negative, neutral) to various interface content components. In this way, the user may provide his/her own feedback in the form of selection of predefined feedback options or as freeform user feedback.

As shown by operation 408, the apparatus 200 includes means, such as processor 202, memory 204, user evaluation circuitry 208, or the like, for determining one or more user preference parameter values. Once the user response has been received, the user evaluation circuitry 208 may determine the one or more user preference parameter values. As described above, the user response set includes user responses to the provided interface content that may be indicative of accessibility issues the user experienced with the interface content and/or user preferences for various interface content. With this information, the user evaluation circuitry 208 may be able to infer user preference parameter values for the user.

In some embodiments, the user evaluation circuitry 208 may be configured to user A user preference parameter value determination model to determine the one or more user preference parameter values for the user. In some embodiments, the user preference parameter values determination model is a machine learning model, such as a neural network, that is configured to receive the user response set and determine one or more user preference parameter values. The user preference parameter values determination model may be trained on historical user responses from users with known user preference parameter values. The user preference parameter values determination model may group or cluster users into user preference groups based on the known user preference parameter values and/or user responses. A user preference group may therefore include one or more users who share similar user preference parameter values. Additionally, the users included in a particular user preference group may further be associated with a known user response set to similarly provided interface content such that users may grouped based on a provided user response. The user preference parameter values determination model may be configured to use any suitable clustering algorithm to determine the one or more user preference groups, such as K-means clustering, hierarchical clustering, density-based spatial clustering of applications with noise (DBSCAN), mean shift clustering, spectral clustering, Gaussian mixture model (GMM), ordering points to identify the clustering structure (OPTICS), and/or the like. In this way, the user preference parameter values determination model may be configured to define user preference groups in a flexible manner that takes into consideration explicit user preference parameter values and inferred user preference parameter values (e.g., as indicated based on the user response). In this way, users may be assigned into a user preference group based on user preference rather than based on a uniform medical diagnosis. This allows for flexibility in the user preference group.

The user preference parameter values determination model may be configured to determine a user preference group to which the user corresponds for one or more user response in the user response set. In some embodiments, the user preference parameter values determination model may consider multiple user responses at once in an instance in which the test prompts for the user responses are determined to be related. In some embodiments, the user preference parameter values determination model is preconfigured with knowledge of related test prompts and may recognize user responses corresponding the related test prompts. The user preference parameter values determination model may evaluate user responses to related test prompts together because this may help provide robust information regarding A user preference parameter value that may be missed if the user responses are evaluated separately. However, it may be beneficial to evaluate user responses that correspond to unrelated test prompt separately to allow the user preference parameter values determination model to focus on a single user preference parameter value. For example, user responses to evaluate a user preference to a text size may be unrelated to user responses that evaluate a user preference for having a screen reader on. Thus, these user responses should be evaluated separately. In this way, individual user preference parameter values may be determined for the user.

In some embodiments, the user preference parameter values determination model may determine a similarity between the one or more user responses and corresponding user responses of historical users. The user preference parameter values determination model may determine a similarity between the one or more user responses using any suitable algorithm, such as a Euclidean distance algorithm, a cosine similarity algorithm, a Jaccard similarity algorithm, a Levenshtein distance algorithm, a hamming distance algorithm, a TF-IDF algorithm, a Pearson correlation coefficient algorithm, a Spearman's rank correlation algorithm, a histogram comparison algorithm, a structural similarity index (SSIM) algorithm, a feature matching algorithm, and/or the like. In some embodiments, the user preference parameter values determination model may determine a similarity score between the one or more user responses and one or more user responses for the known historical users. Alternatively, the user preference parameter values determination model may determine a centroid for each user preference group and then determine a similarity score between the one or more user responses and the one or more user responses for the centroid of the user preference group, thereby reducing the overall number of similarity scores to be determined and conserving computational resources while maintaining accuracy.

The user preference parameter values determination model may then determine a user preference group for the user based on the user response similarity. The user preference parameter values determination model may then determine the user preference parameter values for the user based on the user preference parameter values known for the historical users included in the user preference group. Additionally, the determined user preference parameter values is the user preference parameter values known to be related to the user responses. In some embodiments, the user preference parameter values determination model may determine the user preference parameter values by determining a mode for A user preference parameter value. For example, the user preference parameter values determination model may simply determine the user preference parameter values that is most assigned to historical users in the user preference group. This technique may be always used for user preferences that are categorical (e.g., binary, defined categories, one-hot encoded, or the like) or are otherwise discrete. Alternatively, the user preference parameter values determination model may determine A user preference parameter value by determining an average for A user preference parameter value. This technique may be useful for user preferences that are continuous (e.g., numerical values).

Returning now to FIG. 3, optionally, as shown by operation 304, the apparatus 200 includes means, such as processor 202, memory 204, digital identity management circuitry 210, or the like, for generating one or more accessibility tools. In some embodiments, the digital identity management circuitry 210 may determine that the user could benefit from one or more accessibility tools based on the one or more user preference parameter values. In some embodiments, a user accessibility tool is an add-on, a plug-in, or other software tool. Thus, the accessibility tool may include a set of software instructions that, when executed, may cause execution one or more described operations described by the associated software instructions to be performed.

An accessibility tool may be a tool configured to enhance the accessibility of interface content for a user and/or enhance user interaction. For example, the accessibility tool may be a software tool that when executed, may convert or alter original interface content into a more accessible version of the interface content. By way of particular example, the accessibility tool may be configured to apply color correction filters to improve accessibility of the interface content, which may increase overall interface content contrast and allow low-vision users or colorblind users to more easily view the interface content. As another example, the accessibility tool may be configured to apply text filters to improve accessibility of the interface content, which may alter or modify how the text is displayed in interface content and/or the text itself and thereby allow users that have difficulty reading or understanding certain text to more easily read the text in the interface content. As another example, the accessibility tool may be configured to enable a screen reader to read text of displayed interface content. As another example, the accessibility tool may be configured to automatically translate audio or text from one language to another language. As yet another example, the accessibility tool may be configured to automatically provide accessibility narration and/or closed captioning for various media.

In some embodiments, the digital identity management circuitry 210 may determine whether a user preference parameter value is indicative that the user may benefit from an accessibility tool type. In particular, some user preference parameter values may be associated with an accessibility tool type such that digital identity management circuitry 210 may determine which accessibility tools to generate for the user. For example, a user preference parameter value of "on" for a screen reader user preference parameter may be associated with a screen reader accessibility tool type.

In some embodiments, if the digital identity management circuitry 210 determines an accessibility tool type should be generated for the user, the digital identity management circuitry 210 may access an accessibility tool template corresponding to the accessibility tool type. The accessibility tool template may include code snippets, code functions, code variables, and/or the like. The accessibility tool template may define various variables, functions, and/or the like and further, may have one or more undefined variable values. Thus, an accessibility tool template may provide software instructions that can be executed to perform a particular operation. However, the digital identity management circuitry 210 must first update the one or more undefined variable values in the accessibility tool template. In doing so, the digital identity management circuitry 210 may generate an accessibility tool, that includes a complete set of software instructions. The digital identity management circuitry 210 may determine values for the one or more undefined variable values based on the one or more user preference parameters. For example, user preference parameter values may be determined for user preference parameters of an audio volume setting, an audio pitch setting, an audio frequency setting, an audio gain setting, etc. By way of continuing example, an accessibility tool template for a screen reader accessibility tool type may have undefined variable values for an audio volume setting, an audio pitch setting, an audio frequency setting, an audio gain setting. Thus, the digital identity management circuitry 210 may use the determine user preference parameter values to complete the accessibility tool template and thereby, generate the accessibility tool.

In some embodiments, the digital identity management circuitry 210 may request the user to accept an accessibility tool prior to generating the accessibility tool. For example, the digital identity management circuitry 210 may generate an accessibility tool generation notification that is indicative that one or more accessibility tools have been identified for the user that may be beneficial and may request user input to either confirm or deny the generation of the accessibility tool. The communications hardware 206 may provide the accessibility tool generation notification to the user via his/her user device (e.g., any one of user devices 106A-106N) and receive a user response to the notification. The digital identity management circuitry 210 may process the response to determine whether the user provided affirmative user input confirming the generating of the accessibility tool or did not respond or denied generating the accessibility tool. In an instance in which the user provided affirmative user input, the digital identity management circuitry 210 may proceed to generate the one or more accessibility tools that the user confirmed. Otherwise, the digital identity management circuitry 210 may skip generating the one or more accessibility tools.

As shown by operation 306, the apparatus 200 includes means, such as processor 202, memory 204, digital identity management circuitry 210, or the like, for generating a user preference digital profile. Once the digital identity management circuitry 210 has determined the one or more user preference parameter values for one or more user preference parameters, the digital identity management circuitry 210 may generate a user preference digital profile. The user preference digital profile may include an indication of the one or more user preference parameter values for the one or more user preference parameters. The user preference digital profile may be a structured data object that may include the one or more user preference parameter values for the one or more user preference parameters. As such, the user preference digital profile may provide an indication of the user preferences to one or more recipient users. The user may use the user preference digital profile to provide an indication of his/her user preferences to one or more institutions, entities, or other users to help facilitate a more pleasant interaction experience for all parties. Additionally, the user preference digital profile may include the one or more accessibility tools generated for the user. In this way, the user preference digital profile may allow for enhanced accessibility services during user interactions where the other party (e.g., user, institution, entity, or other party) lacks such accessibility functionality.

In some embodiments, the digital identity management repository 110 may generate the user preference digital profile based on the digital identity management repository 110. In some embodiments, digital identity management repository 110 is a storage repository, such as a database, that is configured to store user preference digital profiles. In some embodiments, the digital identity management repository 110 may be a relational database, a NoSQL database, a new SQL database, an in-memory database, an object-oriented database, a graph database, a time-series database, and/or the like. The digital identity management circuitry 210 may format the user preference digital profile as required by the digital identity management repository 110.

Alternatively, in some embodiments, the digital identity management repository 110 corresponds to a DLT infrastructure, such as a blockchain. In some embodiments, the digital identity management circuitry 210 may be configured to determine the rules and protocols for a blockchain using one or more application programming interfaces (APIs) provided for a blockchain. The digital identity management circuitry 210 may then generate the user preference digital profile for the authentic communication in accordance with the required formatting of the blockchain (e.g., digital identity management repository 110).

In some embodiments, the digital identity management circuitry 210 may additionally encrypt the user preference digital profile such that it may be securely transmitted and/or stored. The digital identity management circuitry 210 may be configured to use any suitable cryptographic technique to encrypt the user preference digital profile.

As shown by operation 308, the apparatus 200 includes means, such as processor 202, memory 204, digital identity management circuitry 210, or the like, for assigning a sharing category to each user preference parameter values. Once the digital identity management circuitry 210 has generated the user preference digital profile that includes the one or more user preference parameter values, the digital identity management circuitry 210 may assign a sharing category for each user preference parameter value. A sharing category may control when and how the user preference parameter value is shared with one or more other users, entities, and/or other parties. For example, a sharing category may include an "always" sharing category, a "requested" sharing category, and a "required" sharing category. An "always" sharing category may allow the user preference parameter value to be shared any time a sharing request is received. A "requested" sharing category may allow the user preference parameter value to be shared any when requested by the user and/or the other party. A "necessary" sharing category may allow the user preference parameter value to be shared only when it's determined to be necessary for the other party.

In some embodiments, the digital identity management circuitry 210 may initially assign a default sharing category to each user preference parameter value. A default sharing category may be preconfigured for each user preference parameter. Thus, the digital identity management circuitry 210 may assign the default sharing category to each user preference parameter value based on its corresponding user preference parameter. A default sharing category may be configured and/or set by one or more administrators or developers associated with apparatus 200 (e.g., employees).

In some embodiments, the digital identity management circuitry 210 may request the user to accept and/or modify the one or more sharing categories. For example, the digital identity management circuitry 210 may generate a sharing category notification that is indicative of the one or more default sharing categories for each user preference parameter value and may request user input to either confirm the default sharing category or modify the default sharing category. The communications hardware 206 may provide the sharing category notification to the user via his/her user device (e.g., any one of user devices 106A-106N) and receive a user response to the notification. The digital identity management circuitry 210 may process the response to determine whether the user has accepted a default sharing category, modified a sharing category, or failed to provide a response for the one or more user preference parameter values. In an instance in which the user modified a sharing category, the digital identity management circuitry 210 may update the sharing category for the user preference parameter value to the modified sharing category in the user preference digital profile. Alternatively, in an instance in which the user accepted the default sharing category or failed to provide a response (e.g., within a response time window), the digital identity management circuitry 210 may maintain the default sharing category for the user preference parameter value.

As shown by operation 310, the apparatus 200 includes means, such as processor 202, memory 204, communications hardware 206, digital identity management circuitry 210, or the like, for storing the user preference digital profile. Once the digital identity management circuitry 210 has generated the user preference digital profile, the digital identity management circuitry 210 may store the user preference digital profile such that it may be used in the future. In particular, the digital identity management circuitry 210 may store the user preference digital profile in a digital identity management repository 110.

In an instance in which the digital identity management repository 110 is a database, the communications hardware 206 may be configured to provide the user preference digital profile directly to the digital identity management repository 110. Alternatively, in an instance in which the digital identity management repository 110 is a blockchain, the communications hardware 206 may provide the user preference digital profile to associated nodes of the blockchain network using any suitable blockchain authentication techniques.

In some embodiments, the digital identity management circuitry 210 may further associated the user preference digital profile with a user account. As such, the user preference digital profile may be associated with the user account. This may also associate the user preference digital profile with the user identifier and user credentials associated with the user account. This may allow the digital identity management circuitry 210 to authenticate update requests received from a user (e.g., via a user device, such as any one of user device 106A-106N) based on the provided user credential. Additionally, as will described in further detail in FIG. 5, this may allow the digital identity management circuitry 210 authenticate a sharing request.

Optionally, as shown by operation 312, the apparatus 200 includes means, such as processor 202, memory 204, communications hardware 206, digital identity management circuitry 210 or the like, for providing a user preference digital profile token to a user device. In some embodiments, a user may wish to provide an indication of the user preference digital profile to other users and/or user devices (e.g., any one of user device 106A-106N) and/or entity device (e.g., any one of entity devices 108A-108N) using his/her user device (e.g., any one of user devices 106A-106N). To facilitate this interaction, the digital identity management circuitry 210 may generate a user preference digital profile token and the communications hardware 206 may provide the user preference digital profile token to a user device, such as the user device that provided the user preference digital profile request.

The user preference digital profile token may be a token that is capable of being locally stored on the recipient user device. The user preference digital profile token may be indicative of a storage location of the user preference digital profile. For example, the user preference digital profile token may include a URL or a unique identifier (URI) indicative of a location of the user preference digital profile within the digital identity management repository 110. Additionally, in some embodiments the user preference digital profile token may serve as a means of authenticating subsequent requests from a user device and/or entity device. For example, a user preference digital profile token may be a unique value that is representative of user credentials. Thus, in some embodiments, the user preference digital profile token may serve to authenticate requests, such as update requests and/or sharing requests. The user device may be configured to locally store the user preference digital profile token in an associated memory upon receipt and in some embodiments, may encrypt or otherwise protect the user preference digital profile token.

Optionally, as shown by operation 314, the apparatus 200 includes means, such as processor 202, memory 204, communications hardware 206, or the like, for receiving an update request. In some embodiments, the user may wish to update the user preference digital profile. For example, the user may wish to modify one or more user preference parameter values (e.g., either manually or by providing user responses to provided interface content as described in FIG. 4) and/or modify one or more accessibility tools. To do so, the user may provide an update request using his/her user device (e.g., any one of user devices 106A-106N), such as via a mobile application, web application, native application, etc. The communications hardware may receive an update request from the user device in an instance in which the user has selected an option to modify the user preference digital profile.

In some embodiments, the user may first be required to log into his/her account to provide the update request. If the user is already logged into a user account, the update request may include an authentication token that is indicative that the user device has been authenticated for the secure session. Alternatively, the user may automatically provide an update request without first logging into a user account. In an instance in which the user is not yet logged into a user account, the update request may include a user identifier and candidate user credential that must first be authenticated prior to allowing the user to modify or the user preference digital profile.

Optionally, as shown by operation 316, the apparatus 200 includes means, such as processor 202, memory 204, digital identity management circuitry 210, or the like, for authenticating the update request. As described above, the digital identity management circuitry 210 may first be required to authenticate an update request prior to allowing the user to modify the user preference digital profile. In an instance in which the user was already logged into the user account and the update request includes an authentication token, the digital identity management circuitry 210 may simply verify whether the provided authentication token corresponds to a stored authentication token for the user device for the current session. In an instance in which the provided authentication token corresponds to the stored authentication token, the digital identity management circuitry 210 may successfully authenticate the update request. In an instance in which the provided authentication token fails to correspond to the stored authentication token, the digital identity management circuitry 210 may reject authenticate the update request.

Alternatively, in an instance in which the user is not currently logged into a user account such that there is not currently active session, the digital identity management circuitry 210 may perform an authentication routine to first verify the user and/or user device. In particular, the digital identity management circuitry 210 may determine whether the provided user credential corresponds to a stored user credential for the user account. The digital identity management circuitry 210 may identify the corresponding user account using a provided user identifier. The digital identity management circuitry 210 may then perform an authentication routine, which may use one or more hash algorithms to hash a provided user credential to allow for comparison with a stored user credential, which may also be hashed. In an instance in which the digital identity management circuitry 210 determines the provided user credential corresponds to the stored user credential for the user account associated with the provided user identifier, the digital identity management circuitry 210 may authenticate the update request. In an instance in which the digital identity management circuitry 210 determines the provided user credential fails to correspond to the stored user credential for the user account associated with the provided user identifier, the digital identity management circuitry 210 may reject the update request.

Optionally, as shown by operation 318, the apparatus 200 includes means, such as processor 202, memory 204, digital identity management circuitry 210, or the like, determining whether the update request was successfully authenticated. In an instance in which the update request fails to be successfully authenticated, the process may proceed to operation 320. Optionally, as shown by operation 320, the apparatus 200 includes means, such as processor 202, memory 204, communications hardware 206, digital identity management circuitry 210, or the like, for maintaining the user preference digital profile. In an instance in which the digital identity management circuitry 210 fails to authenticate the update request, the digital identity management circuitry 210 may maintain the user preference digital profile. In some embodiments, the communications hardware 206 may provide an update request rejection to the user device. The update request rejection may be indicative that the user could not be authenticated and therefore, cannot access or modify the user preference digital profile. The update request rejection may further allow the user to try to provide a new update request unless a threshold number of update requests have been received from the user device. In this way, the user may be notified that the update request was unsuccessful and offered an opportunity to retry the update request, unless the user has failed authentication over a threshold number.

In an instance in which the update request is successfully authenticated, the process may proceed to operation 322. Optionally, as shown by operation 320, the apparatus 200 includes means, such as processor 202, memory 204, communications hardware 206, digital identity management circuitry 210, or the like, for updating the user preference digital profile. In an instance in which the digital identity management circuitry 210 successfully authenticates the update request, the digital identity management circuitry 210 may verify the user identity and thus, allow the user to modify or update the user preference digital profile. Once the digital identity management circuitry 210 has successfully authenticated the update request, the user device may be allowed to access the user preference digital profile.

In some embodiments, the communications hardware 206 may provide the user device with access to the user preference digital profile within the mobile application, web application, and/or native application used by the user device. In some embodiments, the communications hardware 206 may provide the user device access to the user preference digital profile using an HTML response and/or via one or more APIs. The user may provide user input to modify the one or more user preference parameter values, sharing category for one or more user preference parameter values, accessibility tools, and/or the like. Additionally, as will be described in further detail in FIG. 5, a user may modify the entities which are linked to the user preference digital profile. The user may also modify an access setting for each linked entity. In some embodiments, the user device may allow the user to have one or more user preference parameter values automatically determined as described in FIG. 4. The communications hardware 206 may receive user input once a user submits user input indicative of one or more modifications, updates, or changes to the user preference digital profile. The digital identity management circuitry 210 may then update the user preference digital profile based on the received user input. In doing so, the digital identity management circuitry 210 may allow the user to maintain an up-to-date and accurate user preference digital profile. Therefore, as user preferences evolve over time, the user preference digital profile may be maintained and updated to reflect these changes and subsequently facilitate more positive user interactions.

Figure 6:
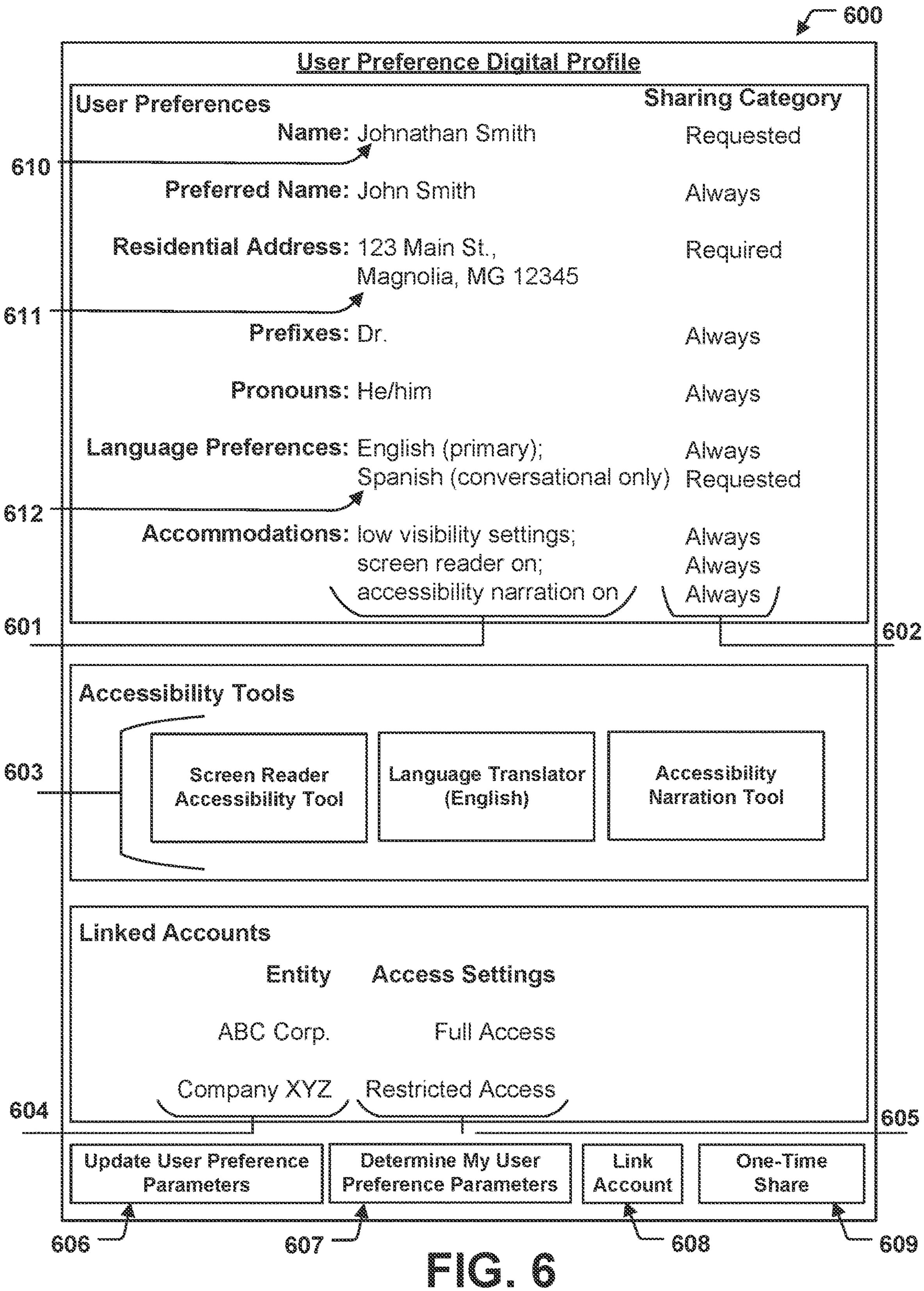
FIG. 6 illustrates an example user preference digital profile as used in some example embodiments described herein.

Turning now to FIG. 6, an example graphic user interface (GUI) depicting a user preference digital profile 600 is illustrated. As noted previously, a user may interact with the digital identity management system 102 by directly engaging with communications hardware 206 of an apparatus 200. In such an embodiment, the GUI shown in FIG. 6 may be displayed to a user by the apparatus 200. Alternatively, a user may interact with the digital identity management system 102 using a separate user device (e.g., any of user devices 106A-106N, as shown in FIG. 1), which may communicate with the digital identity management system 102 via communications network 104. In such an embodiment, the GUI shown in FIG. 6 may be displayed to the user by the user device or via an associated display.

FIG. 6 depicts an example user preference digital profile 600. As shown in FIG. 6, the user preference digital profile 600 may include one or more user preference parameter values 601 for one or more user preference parameters. Additionally, each user preference parameter value may be associated with a sharing category 602. The user preference digital profile 600 may further include one or more accessibility tools 603. The user may manage the one or more user preference parameter values, the sharing category, and/or the accessibility tools using an update request.

Additionally, the user preference digital profile 600 may include an indication of one or more linked accounts. As will be described in greater detail in FIG. 5, a user may wish to share the user preference digital profile with one or more entities (e.g., other users, organizations, and/or other parties). Thus, the user may link one or more external user accounts to the user preference digital profile such that an entity associated with a linked external user account is provided with at least a portion of the information. The extend of the information provided to the external user account may be controlled using access settings. As shown in FIG. 6, each linked entity 604 is associated with an access setting 605.

Furthermore, the user preference digital profile 600 may include one or more user interaction elements 606-609. A user may interact (e.g., touch, click, audibly select, etc.) with a user interaction element to request a corresponding operation to be performed. For example, a user may interact with user interaction element 606 to update one or more user preference parameters. This may cause the communications hardware to receive an update request. As another example, a user may interact with user interaction element 607 to request an update request and further, cause digital identity management circuitry 210 to automatically determine one or more user preference parameter values for the user, as described in FIG. 4. As another example, the user may interact with user interaction element 608 to provide a request to link one or more external user accounts to the user preference digital profile. This may cause a sharing request to be received, as described in FIG. 5. As yet another example, the user may interact with user interaction element 609 to request that the user preference digital profile be provided to one or more entity devices and/or user devices. This may cause a sharing request to be received, as described in FIG. 5.

Example Operations for Providing a Sharing Response

Turning to FIG. 5, example operations are shown for providing a sharing response to a received sharing request. As shown by operation 502, the apparatus 200 includes means, such as processor 202, memory 204, communications hardware 206, digital identity management circuitry 210, or the like, for receiving a sharing request. The communications hardware 206 may receive a sharing request from a user via a user device (e.g., any one of user devices 106A-106N) or from an entity device (e.g., any one of entity devices 108A-108N). The sharing device may be indicative of a request to share a portion of the information included in the user preference digital profile with one or more entities. The sharing request may include an indication of a recipient device. The recipient device may be an entity device (e.g., any one or entity device 108A-108N). In some example embodiments, a user may wish to provide a user preference digital profile to an entity such that the entity or users associated with the entity (e.g., customer service agents) may be provided with one or more user preference parameter values of the user. Additionally, associated entity devices, such as kiosks, point-of-sale terminals, displays, and/or the like may be configured to display interface content that is tailored to the user's user preference parameter values. This may additionally be achieved through the use of the one or more accessibility tools included in the user preference digital profile. However, prior to providing a sharing response that includes one or more user preference parameters and/or accessibility tools, the sharing request must first be authenticated, and an authorized sharing category must be determined for the sharing request.

As mentioned above, the sharing request may be received from a user device. For example, a user may use his/her user device to provide the sharing request. The user may provide an indication of a recipient device (e.g., a user device identifier, a user device phone number, a user device serial number, etc.). In some embodiments, a user may manually enter an indication of a recipient device. Alternatively, the user device and recipient device (e.g., an entity device) may communicate, such as via Bluetooth, near-field communication (NFC), radio frequency identification (RFID), etc. such that the recipient device may provide the user device with the indication of the user identifier.

Alternatively, the sharing request may be received from an entity device. For example, the user device and recipient device (e.g., an entity device) may communicate, such as via Bluetooth, NFC, RFID, etc. and the user device may provide the entity device with a user preference digital profile token. The entity device may provide a sharing request to the communications hardware 206 in response to receipt of the user preference digital profile token. The entity device may include an indication of itself in the sharing request.

Additionally, the sharing request may include a candidate user credential for the user preference digital profile. For example, in some embodiments, the user may need to provide a user credential (e.g., a password, PIN, and/or the like) in the sharing request. In some embodiments, the sharing request may include the user preference digital profile token that may be used as a candidate user credential. Furthermore, in some embodiments, the sharing request may include an indication of an authorized sharing category for the sharing request. This may be provided by the user.

The sharing request may be a request for a one-time provision of information from the user preference digital content profile to an entity. Alternatively, the sharing request may be a request to freely allow an entity device or entity to access to information from the user preference digital content profile under particular circumstances. In particular, in some embodiments, a sharing request may further include a request to link an external user account to the user preference digital profile. As described in further detail in operation 512, linked external user accounts may be provided with select access to the external user account based on an access setting associated with the account. In some embodiments, the user may provide an external user account identifier (e.g., a username, email address, phone number, and/or the like) along with an external entity identifier (e.g., a domain name, an organization or company name, and/or the like) for the external user account. The external entity identifier may be used to identify the entity with whom the external user account identifier is maintained with, and the external user account identifier may be indicative of the particular identity of the external user account. In some embodiments, the sharing request may further include an external user account credential associated with the external user account. In this way, the digital identity management circuitry 210 may communicate with an entity device (e.g., any one of entity devices 108-108N) and may provide required information (e.g., third party user account identifier and/or a third party user account credential) such that the entity device may authenticate communications received from the digital identity management circuitry 210 and enable the user preference digital profile to be linked to the external user account.

Additionally, the user may provide an indication of the access setting for an external user account in the sharing request. The access setting for a given linked user account may control what user preference parameters and/or accessibility tools are provided to an entity device associated with the external user account. An access setting may include categorical values of "full access", "limited access", or "restricted access". An authorized sharing category of full access may receive all user preference parameters and accessibility tools included within the user preference digital profile. An authorized sharing category of limited access may receive user preference parameters associated with an "always" and "requested" sharing categories and may receive the accessibility tools included within the user preference digital profile. An authorized sharing category of restricted access may receive only user preference parameters associated with an "always" sharing category and may receive the accessibility tools included within the user preference digital profile.

As shown by operation 504, the apparatus 200 includes means, such as processor 202, memory 204, digital identity management circuitry 210, or the like, for authenticating the sharing request. The digital identity management circuitry 210 may be required to authenticate a sharing request prior to providing a recipient device with a sharing response. In particular, the digital identity management circuitry 210 may determine whether the provided user credential corresponds to a stored user credential. In particular, the digital identity management circuitry 210 may determine whether the provided user credential corresponds to a stored user credential for the user account. In some embodiments, the digital identity management circuitry 210 may identify the corresponding user account using a provided user identifier, if one was provided in the sharing request.

In some embodiments, the digital identity management circuitry 210 may identify the corresponding user account using a provided user preference digital profile token. The digital identity management circuitry 210 may then perform an authentication routine. For example, the digital identity management circuitry 210 may use a hash algorithm to hash a provided user credential to allow for comparison with a stored user credential, which may also be hashed. Alternatively, the digital identity management circuitry 210 may compare a received user preference digital profile token and a stored user preference digital profile token associated with the user account. Here, the received user preference digital profile token may be used as the user credentials.

In an instance in which the digital identity management circuitry 210 determines the provided user credential corresponds to the stored user credential for the user account associated with the provided user identifier, the digital identity management circuitry 210 may authenticate the sharing request. In an instance in which the digital identity management circuitry 210 determines the provided user credential fails to correspond to the stored user credential for the user account associated with the provided user identifier, the digital identity management circuitry 210 may reject the sharing request.

As shown by operation 506, the apparatus 200 includes means, such as processor 202, memory 204, digital identity management circuitry 210, or the like, for determining whether the sharing request is successfully authenticated. In an instance in which the sharing request fails to be successfully authenticated, the process proceeds to operation 514. As shown by operation 514, the apparatus 200 includes means, such as processor 202, memory 204, communications hardware 206, digital identity management circuitry 210, or the like, for generating a sharing response. In the instance in which the sharing request fails to be authenticated, the sharing response may be indicative of a failure to authenticate the sharing request. In some embodiments, the communications hardware 206 may provide the sharing response to the user device. As such, the user may be made aware that the sharing request was not authenticate and the user may generate a new sharing request if desired.

In an instance in which the sharing request is successfully authenticated, the process proceeds to operation 508. Optionally, as shown by operation 508, the apparatus 200 includes means, such as processor 202, memory 204, digital identity management circuitry 210, or the like, for determining an authorized sharing category for the sharing request. In some embodiments, the digital identity management circuitry 210 may determine whether the sharing request includes an authorized sharing category as provided by the user. For example, a user may include an indication of whether the recipient device should receive full access, limited access, or restricted access. As described above, an authorized sharing category of full access may receive all user preference parameters and accessibility tools included within the user preference digital profile. An authorized sharing category of limited access may receive user preference parameters associated with an "always" and "requested" sharing categories and may receive the accessibility tools included within the user preference digital profile. An authorized sharing category of restricted access may receive only user preference parameters associated with an "always" sharing category and may receive the accessibility tools included within the user preference digital profile.

In some embodiments, in an instance in which the user does not include an authorized sharing category in the sharing request, the digital identity management circuitry 210 may determine a default authorized sharing category for the sharing request. The default authorized sharing category may be one of the available authorized sharing categories. In some embodiments, the default authorized sharing category is preset by one or more administrators or users associated with apparatus 200. Alternatively, a user may set a default authorized sharing category.

As shown by operation 510, the apparatus 200 includes means, such as processor 202, memory 204, digital identity management circuitry 210, or the like, for determining one or more user preference parameter values to include in a sharing response. The digital identity management circuitry 210 may determine the one or more user preference parameter values to include based on a sharing category assigned to each of the one or more user preference parameter values included in the user preference digital profile.

In some embodiments, in an instance a sharing request is received from an entity device, the sharing request may include an indication of user preference parameters that are requested and/or required by an entity associated with the entity device. As such, the digital identity management circuitry 210 may evaluate whether the assigned sharing category for the user preference parameter value allows the user preference parameter value to be shared with the entity. For example, the sharing request may be indicative that the entity requires a name and requests a residential address. Referring back to the user preference digital profile in FIG. 6, the name user preference parameter value is associated with a requested sharing category and the residential address is associated with a required sharing category. Thus, the digital identity management circuitry 210 may determine that the name user preference parameter should be included in the sharing response because its sharing category allows it to be shared if requested and the sharing request indicates the name user preference parameter value is required. However, the digital identity management circuitry 210 may determine that the residential address user preference parameter should not be included in the sharing response because its sharing category only allows it to be shared if required and the sharing request indicates the residential address user preference parameter value is only requested, not required.

In some embodiments, the digital identity management circuitry 210 may evaluate whether the authorized sharing category determined for the sharing request and determine the one or more user preference parameter values to include in the sharing response based on the authorized sharing category of the sharing request and the sharing category for each of the user preference parameter values. As described above, an authorized sharing category of full access may receive all user preference parameters included within the user preference digital profile. Thus, in an instance in which the authorized sharing category for the sharing response is determined to be full access, the digital identity management circuitry 210 may determine to include all user preference parameter values included in the user preference digital profile in the sharing response. That is, user preference parameter values associated with an "always", "requested", or "required" sharing category may be included in the sharing response for a sharing request determined to have a full access authorized sharing category. An authorized sharing category of limited access may receive user preference parameters associated with an "always" and "requested" sharing categories included within the user preference digital profile. Thus, in an instance in which the authorized sharing category for the sharing response is determined to be limited access, the digital identity management circuitry 210 may determine to include user preference parameter values assigned an "always" or "requested" sharing category but not include user preference parameter values assigned a "required" sharing category. An authorized sharing category of restricted access may receive only user preference parameters associated with an "always" sharing category and may receive the accessibility tools included within the user preference digital profile. Thus, in an instance in which the authorized sharing category for the sharing response is determined to be restricted access, the digital identity management circuitry 210 may determine to only include user preference parameter values assigned an "always" sharing category but not include user preference parameter values assigned a "requested" or "required" sharing category.

Optionally, as shown by operation 512, the apparatus 200 includes means, such as processor 202, memory 204, communications hardware 206, digital identity management circuitry 210, or the like, for updating the user preference digital profile to link one or more external user accounts. As described above, in embodiments, the sharing request may further include a request to link an external user account to the user preference digital profile. In an instance in which the sharing request includes a request to link an external user account, the digital identity management circuitry 210 may determine an entity device (e.g., any one of entity devices 108A-108N) that is associated with the user account. In some embodiments, the digital identity management circuitry 210 may use the external entity identifier to determine an entity device to establish communication with to link the external user account.

Once the digital identity management circuitry 210 has determined the entity device associated with the external user account, the communications hardware 206 may establish a secure communication with the entity device, such as by using a hypertext transfer protocol (HTTP), hypertext transfer protocol secure (HTTPS), and/or one or more APIs. The communications hardware may provide a request to link an external user account to the entity device using any suitable protocol. The request to link an external user account may include the external user account identifier and/or the external user account credential. Thus, the entity device may perform an authentication routine to verify the request to link an external user account. In an instance in which the entity device successfully authenticates the request, the communications hardware 206 may receive a response from the entity device indicative of whether the request was successfully authenticated. The digital identity management circuitry 210 may then proceed to link the external user account to the user preference digital profile.

In some embodiments, in an instance in which the digital identity management repository 110 is a blockchain, the digital identity management circuitry 210 may generate a smart contract that allows an entity device that has an established or authenticated session with the external user account to access a portion of the user preference digital profile for the user. For example, the entity device may provide an indication of the external user account identifier and a confirmation that the entity device has successfully established a secure, authenticated session for the external user account. This may allow the entity device to access a portion of the user preference digital profile.

Alternatively, in an instance in which the digital identity management repository 110 is a database, the digital identity management circuitry 210 may update associated permissions, access rights, and/or the like, of the user preference digital profile to include the external user account identifier and/or external entity identifier. Thus, if the entity device provides an indication of the external user account identifier and a confirmation that the entity device has successfully established a secure, authenticated session for the external user account, the entity device may be granted permission to access a portion of the user preference digital profile.

Once the digital identity management circuitry 210 has linked the external user account with the user preference digital profile (e.g., either via a smart contract or using permissions for the user preference digital profile), the digital identity management circuitry 210 may further assign an access setting to the linked external user account. As described above, the sharing request may be indicative of the access setting for an external user account. Alternatively, if no access setting is provided in a sharing request, a default access setting may be determined. The default access setting may be preset by the user and/or an administrator. The access setting for a given linked user account may control the level of access the external user account is granted with respect to the user preference digital profile. The digital identity management circuitry 210 may update the smart contract and/or permissions or access settings associated with the user preference digital profile to control the level of access granted to the linked external user account.

As shown by operation 514, the apparatus 200 includes means, such as processor 202, memory 204, digital identity management circuitry 210, or the like, for generating the sharing response. The digital identity management circuitry 210 may generate the sharing response to include the one or more determined user preference parameters. Additionally, the sharing response may include the one or more accessibility tools. The sharing response may be formatted in any suitable manner. In some embodiments, the sharing response is a URL or API endpoint for the user preference digital profile. In some embodiments, the sharing response is a data object formatted in any suitable format (e.g., JavaScript object notation (JSON), extensible markup language (XML), and/or the like). In some embodiments, the sharing response includes a block identifier indicative of where the user preference digital profile is stored on a blockchain (e.g., digital identity management repository 110).

As shown by operation 516, the apparatus 200 includes means, such as processor 202, memory 204, communications hardware, or the like, for providing the sharing response. Once the digital identity management circuitry 210 has generated the sharing response, the communications hardware 206 may provide the sharing response. In some embodiments, the communications hardware may be provided to the entity device (e.g., any one or entity devices 108A-108N) that provided the sharing request. In an instance in which the communications hardware 206 received a sharing request from a user device, the communications hardware 206 may process the indication of the recipient device included in the sharing request to determine an entity device to provide with the sharing response. Alternatively, in some embodiments, the communications hardware 206 may provide the sharing response to the user device (e.g., any one of user devices 106A-106N) and the user device may provide the sharing response to the entity device, such as by via Bluetooth, NFC, RFID, wi-fi, or any other communication channel. In some embodiments, the user device may utilize the sharing response.

Thus, the entity device and/or user device may receive a sharing response that includes the one or more user preference parameter values and/or accessibility tools. In some embodiments, the user preference parameter values and/or accessibility tools may be rendered for display on an entity device and/or associated device. As such, an entity user associated with the entity device (e.g., a customer service agent) may be provided with user interaction preferences and/or user preferences for viewing interface content. This may allow the entity user to facilitate these accommodations for the user. Additionally, or alternatively, the entity device may automatically execute one or more of the accessibility tools such that interface content presented to the user is automatically made accessible. This may facilitate a more accessible and pleasant user experience for the user without explicit reliance on the entity device to provide these accessibility functionalities.

In some embodiments, the one or more user preference parameters included in the sharing response may also be associated with an activation toggle. In some embodiments, the recipient device may display the interface content along with the associated activation toggles, that the user may interact with (e.g., selecting, clicking, touching, or the like). The activation toggle may control whether the user preference parameter uses a user preference parameter value associated with the user preference digital profile such as when the activation toggle in an "on" state or whether a user preference parameter uses a default or other user's, user preference parameter value, such as when the activation toggle is in an "off" state. In this way, the user may more easily have control over how the user preference parameters included within the sharing response are used and may refine the user preference parameter values based on current need.

For example, the user may desire to show a display associated with a recipient entity device (e.g., any one of entity devices 108A-108N) and/or a recipient user device (e.g., any one of user devices 106A-106N) in a manner that differs from the user's user preference parameter values to enable other individuals to more easily access the sharing response, at least temporarily. By way of particular example, the user may have a specific question about an item displayed by the entity device, but the display is currently in a low visibility mode due to the sharing response including a user preference parameter value with low vision settings. The user may deactivate the low visibility mode for the display by switching the corresponding activation toggle from an "on" state to an "off" state, which results in the display updating to a default user preference parameter value (e.g., not a low vision display settings). This may allow the individual assisting the user to more easily view or otherwise access the displayed content to assist the user. The user may use the activation toggle again to an "on" state to use the user preference parameter value associated with his/her user preference digital profile.

In some embodiments, an entity device (e.g., any one of entity devices 108A-108N) and/or a user device (e.g., any one of user devices 106A-106N) may receive one or more sharing responses from other users. In some embodiments, the recipient device may be configured to apply various rules to determine which user interaction preference values to use for displaying interface content. For example, the recipient device may be configured to apply the user preference parameters for the sharing response that is received first or the most recent sharing response. Additionally, as described above, the displayed content may include activation toggles each associated with a user preference parameter. In an instance in which multiple sharing responses are received, an activation toggle may allow a user to select which user preference parameter value should be used for a user preference parameter. For example, if an entity device receives both a sharing response from user A and user B and user A has a user preference parameter value for "accessibility narration on" whereas user B has a user preference parameter value for "accessibility narration off". Thus, the activation toggle for an accessibility narration user preference parameter may allow users to select the user preference parameter for user A, user B, or a default user preference parameter value. This may help ensure that the interface content is displayed in an optimal way in a manner that is responsive to the user interacting with the interface content.

Figure 7:
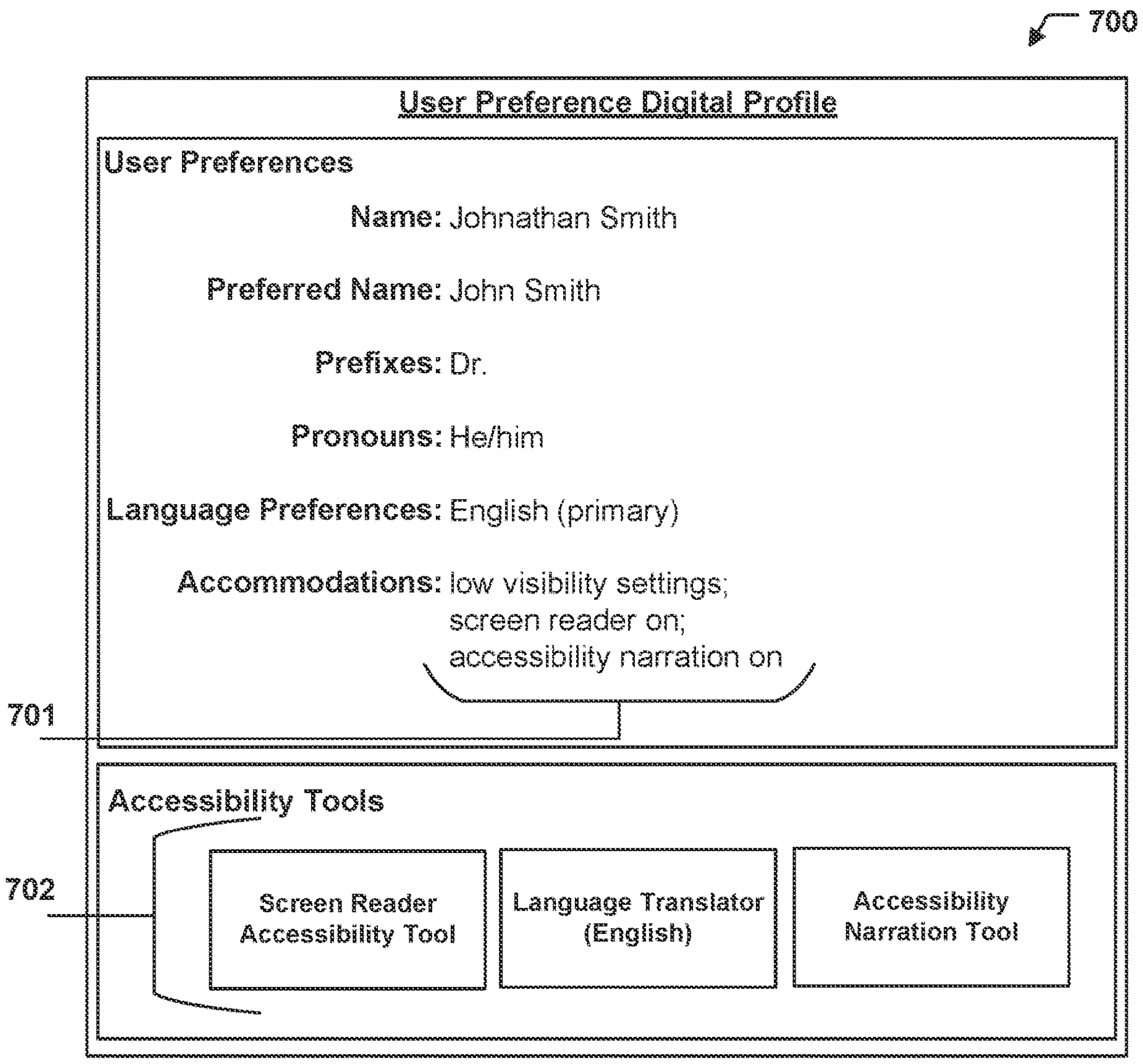
FIG. 7 illustrates an example sharing response as used in some example embodiments described herein.

Turning now to FIG. 7, an example GUI depicting a sharing response 700 is illustrated. As noted previously, a user may interact with the digital identity management system 102 by directly engaging with communications hardware 206 of an apparatus 200. In such an embodiment, the GUI shown in FIG. 7 may be displayed to a user by the apparatus 200. Alternatively, a user may interact with the digital identity management system 102 using a separate user device (e.g., any of user devices 106A-106N, as shown in FIG. 1) or entity device (e.g., any of entity devices 108A-108N, as shown in FIG. 1), which may communicate with the digital identity management system 102 via communications network 104. In such an embodiment, the GUI shown in FIG. 7 may be displayed to the user by the user device or via an associated display.

FIG. 7 depicts an example sharing response 700. As shown in FIG. 7, the sharing response 700 may include one or more user preference parameter values 701 and one or more accessibility tools 702. In particular, the sharing response 700 may include one or more user preference parameter values 701 from the user preference digital profile 600 of FIG. 6. Here, the user preference parameter values 601 associated with an "always" sharing category are included in the sharing response 700. Additionally, user preference parameter value 610, which is associated with a "requested" sharing category is included in the sharing response 700 but the user preference parameter values 611 and 612, which are associated with a "required" and "requested" sharing category, respectively, are not included in the sharing response 700. This may be due to the associated sharing request indicating that a name was requested or required such that user preference parameter value 610 is included in the sharing response 700 but did not indicate a residential address was required or a secondary language was requested, such that user preference parameter values 611 and 612 were not included in the sharing response 700.

FIGS. 3-5 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Conclusion

As described above, example embodiments provide methods and apparatuses that enable users to control and manage their own interaction preferences and accessibility tools. Example embodiments thus provide tools that overcome problems faced by conventional accessibility evaluation standards by removing a user's need to rely on entities to adhere to these limited guidelines. As such, example embodiments described herein do away with the conventional one-size-fits-all approach of conventional standards and allow users to generate and manage their own user preference digital profile. Additionally, example embodiments described herein contemplate automatically determining the user preference parameter values by leveraging machine learning techniques. The user preference digital profile further allows users to include accessibility tools that may enable users to receive accessible interface content, regardless of the current capabilities of an entity. Furthermore, example embodiments described herein allow user to control the provision of information within their user preference digital profile to select entity devices to facilitate enhanced user interactions and ensure the provision of accessible interface content.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for generating a user preference digital profile for a user, the method comprising:

determining, by user evaluation circuitry, one or more user preference parameter values for one or more user preference parameters for the user;

generating, by digital identity management circuitry, the user preference digital profile for the user, wherein the user preference digital profile comprises an indication of the one or more user preference parameter values;

assigning, by the digital identity management circuitry, a sharing category to the one or more user preference parameter values in the user preference digital profile;

storing, by communications hardware, the user preference digital profile in a digital identity management repository;

receiving, by the communications hardware, an update request, wherein the update request comprises (a) value updates for one or more of the one or more user preference parameter values and (b) a candidate user credential for the user preference digital profile;

authenticating, by the digital identity management circuitry, the update request based on the candidate user credential and a user credential associated with the user preference digital profile; and in an instance in which the candidate user credential is successfully authenticated, updating, by the communications hardware, the user preference digital profile to reflect the value updates for the one or more user preference parameter values.

2. The method of claim 1, further comprising:

receiving, by the communications hardware, a sharing request, wherein the sharing request comprises an indication of a recipient device and a candidate user credential for the user preference digital profile;

authenticating, by the digital identity management circuitry, the sharing request based on the candidate user credential and a user credential associated with the user preference digital profile;

in an instance in which the candidate user credential is successfully authenticated, determining, by the digital identity management circuitry, one or more of the one or more user preference parameter values to include in a sharing response based on the sharing category of assigned to the one or more user preference parameter values; and providing, by the communications hardware, the sharing response, wherein the sharing response comprises the determined one or more user preference parameter values.

3. The method of claim 2, wherein the sharing request further comprises an external user account identifier corresponding to an external user account, wherein the method further comprises:

updating, by the communications hardware, access settings for the user preference digital profile to link the external user account to the user preference digital profile.

4. The method of claim 1, further comprising generating, by the digital identity management circuitry, one or more accessibility tools based on the one or more user preference parameter values, wherein (a) a user accessibility tool is an add-on, a plug-in, or other software tool and (b) the one or more accessibility tools are included in the user preference digital profile.

5. The method of claim 1, further comprising:

identifying, by the user evaluation circuitry, a user evaluation set comprising a plurality of interface content, wherein (a) each interface content comprises one or more interface content components and (b) each interface content comprises at least one unique interface content component;

providing, by the communications hardware, interface content to the user;

receiving, by the communications hardware, a user response set comprises one or more user responses to the provided interface content; and determining, by the user evaluation circuitry, one or more of the one or more user preference parameter values for the user based on the one or more user responses.

6. The method of claim 1, wherein the digital identity management repository is a blockchain.

7. The method of claim 1, further comprising providing, by the communications hardware, a user preference digital profile token to a user device associated with the user.

8. An apparatus for generating a user preference digital profile for a user, the apparatus comprising:

user evaluation circuitry configured to determine one or more user preference parameter values for one or more user preference parameters for the user;

digital identity management circuitry configured to:

generate the user preference digital profile for the user, wherein the user preference digital profile comprises an indication of the one or more user preference parameter values, and assign a sharing category to the one or more user preference parameter values in the user preference digital profile; and communications hardware configured to:

store the user preference digital profile in a digital identity management repository; and receive an update request, the update request comprising (a) value updates for one or more of the one or more user preference parameter values and (b) a candidate user credential for the user preference digital profile, wherein the digital identity management circuitry is further configured to authenticate the update request based on the candidate user credential and a user credential associated with the user preference digital profile, wherein the communications hardware, in an instance in which the candidate user credential is successfully authenticated, is further configured to update the user preference digital profile to reflect the value updates for the one or more user preference parameter values.

9. The apparatus of claim 8, wherein the communications hardware is further configured to receive a sharing request, wherein the sharing request comprises an indication of a recipient device and a candidate user credential for the user preference digital profile;

wherein the digital identity management circuitry is further configured to:

authenticate the sharing request based on the candidate user credential and a user credential associated with the user preference digital profile; and in an instance in which the candidate user credential is successfully authenticated, determine one or more of the one or more user preference parameter values to include in a sharing response based on the sharing category of assigned to the one or more user preference parameter values, wherein the communications hardware is further configured to provide the sharing response, wherein the sharing response comprises the determined one or more user preference parameter values.

10. The apparatus of claim 9, wherein the sharing request further comprises an external user account identifier corresponding to an external user account, wherein the communications hardware is further configured to update access settings for the user preference digital profile to link the external user account to the user preference digital profile.

11. The apparatus of claim 8, wherein the digital identity management circuitry is further configured to generate one or more accessibility tools based on the one or more user preference parameter values, wherein (a) a user accessibility tool is an add-on, a plug-in, or other software tool and (b) the one or more accessibility tools are included in the user preference digital profile.

12. The apparatus of claim 8, wherein the user evaluation circuitry is further configured to identify a user evaluation set comprising a plurality of interface content, wherein (a) each interface content comprises one or more interface content components and (b) each interface content comprises at least one unique interface content component;

wherein the communications hardware is further configured to:

provide interface content to the user; and receive a user response set comprises one or more user responses to the provided interface content, wherein the user evaluation circuitry is further configured to determine one or more of the one or more user preference parameter values for the user based on the one or more user responses.

13. The apparatus of claim 8, wherein the digital identity management repository is a blockchain.

14. The apparatus of claim 8, wherein the communications hardware is further configured to provide a user preference digital profile token to a user device associated with the user.

15. A computer program product for generating a user preference digital profile for a user, the computer program product comprising at least one non-transitory computer-readable storage medium storing software instructions that, when executed, cause an apparatus to:

determine one or more user preference parameter values for one or more user preference parameters for the user;

generate the user preference digital profile for the user, wherein the user preference digital profile comprises an indication of the one or more user preference parameter values;

assign a sharing category to the one or more user preference parameter values in the user preference digital profile;

store the user preference digital profile in a digital identity management repository receive an update request, the update request comprising (a) value updates for one or more of the one or more user preference parameter values and (b) a candidate user credential for the user preference digital profile;

authenticate the update request based on the candidate user credential and a user credential associated with the user preference digital profile; and update, in an instance in which the candidate user credential is successfully authenticated, the user preference digital profile to reflect the value updates for the one or more user preference parameter values.

16. The computer program product of claim 15, wherein the software instructions, when executed, further cause the apparatus to:

receive a sharing request, wherein the sharing request comprises an indication of a recipient device and a candidate user credential for the user preference digital profile;

authenticate the sharing request based on the candidate user credential and a user credential associated with the user preference digital profile;

in an instance in which the candidate user credential is successfully authenticated, determine one or more of the one or more user preference parameter values to include in a sharing response based on the sharing category of assigned to the one or more user preference parameter values; and provide the sharing response, wherein the sharing response comprises the determined one or more user preference parameter values.

17. The computer program product of claim 16, wherein the sharing request further comprises an external user account identifier corresponding to an external user account, wherein the software instructions, when executed, further cause the apparatus to update access settings for the user preference digital profile to link the external user account to the user preference digital profile.

18. The computer program product of claim 15, wherein the software instructions, when executed, further cause the apparatus to generate one or more accessibility tools based on the one or more user preference parameter values, wherein (a) a user accessibility tool is an add- on, a plug-in, or other software tool and (b) the one or more accessibility tools are included in the user preference digital profile.

19. The computer program product of claim 15, wherein the software instructions, when executed, further cause the apparatus to identify a user evaluation set comprising a plurality of interface content, wherein (a) each interface content comprises one or more interface content components and (b) each interface content comprises at least one unique interface content component by:

providing interface content to the user, receiving a user response set comprises one or more user responses to the provided interface content, determining one or more of the one or more user preference parameter values for the user based on the one or more user responses.

20. The computer program product of claim 15, wherein the software instructions, when executed, further cause the apparatus to provide a user preference digital profile token to a user device associated with the user.

* * * * *